Oct. 31, 1950   J. A. LAUCK ET AL   2,527,941
PUMP-MULTIPLE PIECE BUSHING
Filed May 22, 1946

Inventors:
John A. Lauck
James A. Compton
By:
Atty

Patented Oct. 31, 1950

2,527,941

UNITED STATES PATENT OFFICE 2,527,941

PUMP-MULTIPLE PIECE BUSHING

John A. Lauck, Shaker Heights, and James A. Compton, South Euclid, Ohio, assignors to Borg-Warner Corporation, Chicago, Ill., a corporation of Illinois Application May 22, 1948, Serial No. 28,646

11 Claims. (Cl. 103—126)

The present invention relates to gear type liquid pressure generators or pumps having bearing and pumping seal defining bushing means embracing the axially extending gear journals.

It is an object of the present invention to provide an improved arrangement of gear pump incorporating bearing and pumping seal defining bushings including radially extending inner flanges and axially outwardly extending tubular portions, furnishing the flexibility, particularly important in pumps of relatively large volumetric displacement.

It is a more specific object to provide an arrangement of this type wherein the bushing assembly is composed of a plurality of parts making it possible for the bearing surface areas to have a limited angular relative movement in order to provide flexibility.

It is still another object to provide an arrangement of the present type incorporating a space between the opposed bushing elements defining a pressure chamber for the reception of the pressure liquid acting to hold the inner bushing member in liquid pumping seal engagement with the corresponding gear side face.

Other objects, advantages and uses of my invention will become apparent from a reading of the following specification taken in connection with the appended drawing and wherein.

Figure 1:
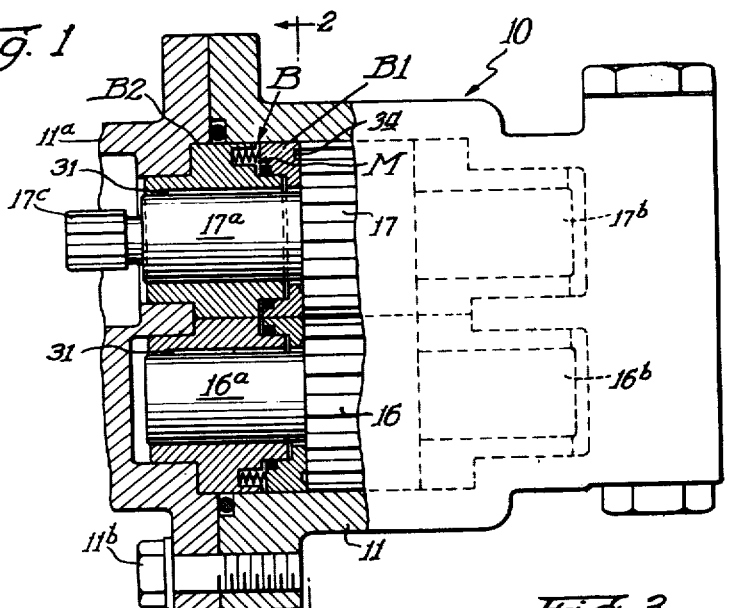
Fig. 1 is an elevation view partially in cross section along 1—1 of Fig. 2 and showing a preferred embodiment of the invention.
Figure 2:
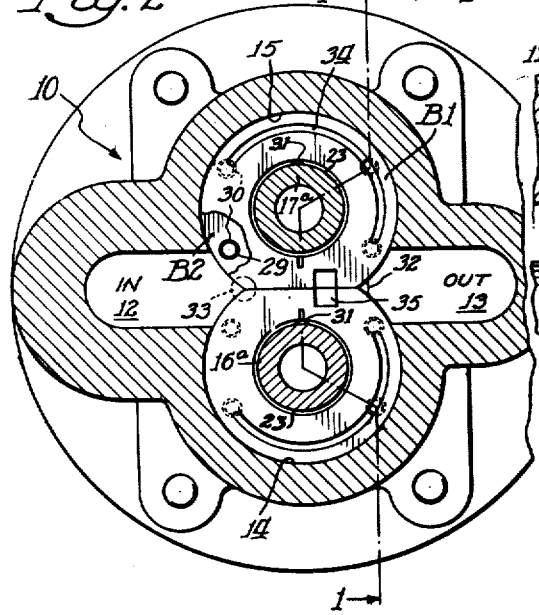
Fig. 2 is a cross sectional view taken substantially on the line 2—2 of Fig. 1.

Referring now in greater detail to the figures of the drawing, a gear pump indicated generally at 10 includes a primary housing section 11 and a closure section 11a. Fluid inlet 12 and fluid pressure outlet 13 have interposed therebetween a pair of overlapping cylindrical chambers 14 and 15. Received in these chambers are a pair of intermeshing gears 16 and 17 formed with axially oppositely extended journals 16a, 16b, 17a and 17b.

Performing the very important function of sealing the radially extending gear side faces on the left hand side thereof in Fig. 1, we have provided a novel and improved bushing construction, comprising a bearing and pumping seal defining assembly indicated generally at B and it is to this novel arrangement in combination that the present invention is particularly directed.

This invention presents an improvement over the earlier construction disclosed and claimed in Roth and Lauck Patent No. 2,420,622.

In the broader aspects of the present invention this pumping seal and bearing defining bushing assembly comprises a plurality of axially disposed parts B1 and B2 so arranged as to provide the flexibility that is required particularly in gear pumps of the present type having a relatively large volumetric displacement.

In the more specific aspects of our invention assembly B comprises a first annular ring shaped member having an inner surface sealing area 20 extending from a position below the roots of the gear teeth radially outwardly coextensive with said teeth, said inner surface sealing area 20 being effective to engage the adjacent gear side face in liquid pumping seal relation. Annular member B1 is further provided with an axially extending cylindrical surface portion 21 adapted to telescopically cooperate with a complementary surface portion of the second annular ring shaped member as will appear. Radially inner surface 22 functions as a first bearing surface for journal 17a, and it will be noted that this surface has a relatively small axial dimension and has a slightly greater inside diameter than the outside diameter of the associated journal. This is important since the same will thus permit of a very limited but nevertheless essential angular movement between the bearing surface represented by the external periphery of journal 17a and sealing surface 20 of annular member B1 normally extending at right angles to the axis of said journal.

For the purpose of properly venting the radial inner terminal of sealing surface 20 to the rear of annular member B1 there is provided by the difference in inside diameter of the surface 22 and the outside diameter of the associated journal an axially extending annular passage 23.

As above indicated this becomes particularly important as the volumetric displacement of a pump of this type is increased.

As the axial dimension of bearing surface 22 was reduced experimentally in an effort to maintain the requisite alignment between all bearing surfaces the problem of continuing to supply the requisite pressure to the rear surface of the bushing for the purpose of pressure loading the same was likewise made more difficult.

The second annular ring shaped member B2 is given a greater axial dimension than that of the first annular member B1. Cylindrical bearing surface 26 thus embraces journal 17a for a considerable portion of the axial extent thereof amounting to several times the axial dimension of bearing surface 22 of annular member B1, the importance of which arrangement will be made to appear. External cylindrical surface 27 of annular member B2 is complementary to and is received telescopically within cylindrical surface 21 of annular ring B1. Flexible donut seal ring 28 is interposed between annular ring members B1 and B2.

For the purpose of normally maintaining an initial pumping seal engagement there are provided a plurality of symmetrically and circumferentially disposed coil compression springs 29 one terminal of each of which engages the closed end of a cylindrical bore 30 formed in annular ring portion B2, while the other terminal engages a rear surface 20a of the first annular ring member B1. The two annular ring portions B1 and B2 are thus normally spaced apart in the area of the above coil compression springs to thus define a motive pressure chamber M providing for the action of pressure liquid generated by the gears 16 and 17 acting on rear surface 20a of the first named annular ring member B1 and effective to cause the inner surface 20 to be urged into liquid pumping seal relation with the corresponding side face of gear 17, as will appear.

Figure 3:
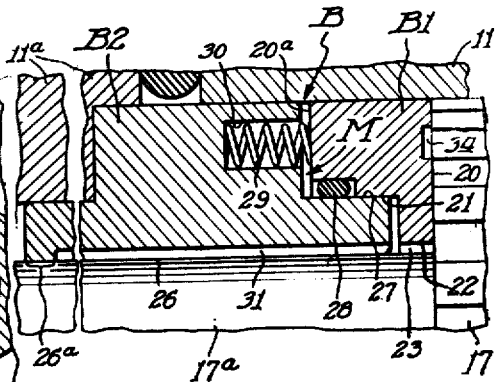
Fig. 3 is a considerably enlarged broken away cross sectional view corresponding to a portion of Fig. 1 and bringing out to particular advantage the novel construction and arrangement of the bushing and bearing assembly forming the subject matter to which the present invention is particularly directed.

Axially extending groove 31 is formed on the inner periphery of the second annular ring member B2 but it will be noted that the same does not extend completely to the left hand terminal of the annular ring, looking at Fig. 3. The internal bearing surface 26 is uninterrupted in the area designated 26a. Due to the manufacturing tolerances present in the area 26a, there will not be a complete seal but merely a small drop in the value of the pressure existing in axially extending groove 31 and the left hand terminal of axially extending bearing surface 26a in communication with the atmospheric pressure. This arrangement has been provided since it has been found that a better operation is realized where a small drop in pressure is present as distinguished from venting axially extending groove 31 directly to the atmospheric pressure.

In Fig. 1, one venting groove 31 is shown as formed in the upper, inner side of upper bushing member B2 and in the upper inner side of the corresponding lower bushing member. The peripheral location of these venting grooves, however, is largely a matter of choice, since the grooves communicate at their inner ends with the annular chamber or groove 23 and at their outer ends with the leakage path at the inner bushing surface 26a. Each groove 31 is made approximately equal in depth to the depth of the annular passage 23, while the width of the groove is selected to provide the requisite venting action.

The output pressure delivered by gears 16 and 17 may be communicated to motive chamber M in any desired manner; however a preferred arrangement effective to accomplish this is disclosed in the above referred to earlier patent and includes the provision of a passage 32 leading from the area of juncture between the upper and lower one of the first named annular ring members B1 to a point in the rear thereof in communication with surface 20a. As in the disclosure of the above patent the opposite corresponding juncture between the upper and lower annular bushing rings B1 is closed by a closure plug 33 indicated in dotted lines and functioning to prevent the recirculation of the pressure liquid back to the inlet side of the gears.

There is of course provided in addition to the above, the necessary remaining elements not forming a special aspect of the present invention but required to complete the structure. Lubricating grooves 34 are formed in the faces 20 of annular bushing rings B1 for a portion only of the circumferential extent thereof. In addition anti-trapping recess 35 is likewise provided. Coupling connector 17c is formed as an extension of upper journal 17a for the purpose of connecting the gears to a suitable source of power, such as a geared connection with an aircraft engine. Fastening means 11b, in the form of cap screws, function to attach closure section 11a to primary section 11 of the housing.

While the present invention has been disclosed in connection with a specific embodiment thereof it is to be understood that this is by way of example rather than limitation and the invention is to be defined by the appended claims which should be accorded a scope commensurate with the prior art.

What is claimed is:

1. In an intermeshing gear type pump having bearing and pumping seal defining bushing means embracing axially extending gear journals and sealably engaging the corresponding gear teeth side faces, said journals extending axially through said bushing means, said bushing means comprising a first annular ring member having an inner radially extending pumping seal defining surface area adapted to engage the corresponding gear side face and having a first internal cylindrical journal bearing area; a second axially outwardly disposed annular ring member, said second annular ring having one surface thereof spaced from the adjacent surface of said first annular ring to thus define a liquid pressure motive chamber therebetween, said second annular ring member having a second internal cylindrical journal bearing area therein, said first and said second journal bearing areas providing for limited angular movement between the plane of said pumping seal defining surfaces and the axis of the corresponding journal.

2. In an intermeshing gear type pump having bearing and pumping seal defining bushing means embracing an axially extending gear journal functioning to provide a bearing for said journal and a pumping seal with the adjacent gear side face, said bushing means comprising a first annular ring shaped member having an inner surface sealing area extending from a position below the roots of the gear teeth radially outwardly coextensive with said teeth, said inner surface sealing area being effective to engage the adjacent gear side face in liquid pumping seal relation; a second annular ring shaped member having a greater axial dimension than that of said first annular member; said first and said second annular members being formed with complementary telescoping portions, an annular liquid sealing ring positioned between said telescoping portions, said first annular member being formed with a second generally radially extending surface area facing axially outwardly from said gear and adapted to be responsive to liquid pressure generated by said pump for holding said first inner surface area in pumping seal engagement with the corresponding gear side face, said second surface area being spaced from the opposed surface of said second annular member to thus provide with the surrounding housing wall, a motive chamber for the liquid pressure to act on said second surface area, spring means between said first and said second annular members effective to insure an initial pumping seal, and means effective to deliver liquid pressure generated by said gears to said motive chamber.

3. In an intermeshing gear type pump having bearing and pumping seal defining bushing means embracing an axially extending gear journal in bearing relation thereto and also sealably engaging the corresponding gear side face, said bushing means comprising a first annular shaped ring member having a first inner radially extending surface area effective to engage the corresponding opposed gear side face in pumping seal relation, said first annular ring shaped member having a first internal cylindrical journal bearing area, and having a stepped countersunk enlarged bore on the outer portion thereof comprising a first countersunk portion and a second enlarged countersunk portion; a second axially outwardly spaced annular ring shaped member, said second annular ring member having a reduced cylindrical portion complementary in size to the first one of said stepped countersunk portions in said first annular member and received in telescoped relation thereto, a flexible-o-ring seal received within the larger one of said countersunk portions and sealably engaging said reduced cylindrical portion of said second annular ring member, coil compression spring means interposed between said first and said second annular ring members effective to maintain said first surface area in initial sealing contact with said gear side face, said first and said second annular members thus being separated to define therebetween an annular liquid pressure receiving motive chamber, and means effective to deliver liquid pressure generated by said gears to said motive chamber, said second annular ring member being further characterized by the provision of a second internal cylindrical journal bearing area, said second cylindrical bearing area having an axial dimension several times the value of the axial dimension of said first internal cylindrical journal bearing area.

4. In an intermeshing gear type pump having bearing and pumping seal defining bushing means embracing an axially extending gear journal in bearing relation thereto and also sealably engaging the corresponding gear side face, said bushing means comprising a first annular shaped ring member having a first inner radially extending surface area effective to engage the corresponding opposed gear side face in pumping seal relation, said first annular ring shaped member having a first internal cylindrical journal bearing area, and having a stepped countersunk enlarged bore on the outer portion thereof comprising a first countersunk portion and a second enlarged countersunk portion; a second axially outwardly spaced annular ring shaped member, said second annular ring member having a reduced cylindrical portion complementary in size to the first one of said stepped countersunk portions in said first annular member and received in telescoped relation thereto, a flexible-o-ring seal received within the larger one of said countersunk portions and sealably engaging said reduced cylindrical portion of said second annular ring member, coil compression spring means interposed between said first and said second annular ring members effective to maintain said first surface area in initial sealing contact with said gear side face, said first and said second annular members thus being separated to define therebetween an annular liquid pressure receiving motive chamber, and means effective to deliver liquid pressure generated by said gears to said motive chamber, said second annular ring member being further characterized by the provision of a second internal cylindrical journal bearing area, said second cylindrical bearing area having an axial dimension several times the value of the axial dimension of said first internal cylindrical journal bearing area, said first named annular member being further characterized by the provision of an axially extending annular passage formed between the inside diameter of the first annular ring member and the periphery of the journal and said second named annular ring member being further characterized by the provision of an axially extending relief groove formed in said second cylindrical bearing surface, said relief groove terminating axially short of the outer terminal of said second cylindrical bearing surface area.

5. An intermeshing gear type pump having bearing and pumping seal defining bushing means embracing axially extending gear journals and sealably engaging the corresponding gear teeth side faces, said bushing means being formed in a plurality of axially disposed, partially overlapping parts, said gear journals extending axially through said bushing means, and means disposed between at least two of said parts for urging said parts axially apart, said plurality of bushing parts being effective to permit limited flexibility of alignment between the portion of said bushing means engaging the gear teeth side faces and the portion of said bushing means embracing the gear journals.

6. An intermeshing gear type pump having bearing and pumping seal defining bushing means embracing axially extending gear journals and sealably engaging the corresponding gear teeth side faces, said bushing means being formed in a plurality of substantially concentric, partially overlapping parts, said gear journals extending axially through said bushing means, and means disposed between at least two of said parts for urging said parts axially apart, said plurality of bushing parts being effective to permit limited flexibility of alignment between the portion of said bushing means engaging the gear teeth side faces and the portion of said bushing means embracing the gear journals.

7. An intermeshing gear type pump having bearing and pumping seal defining bushing means embracing axially extending gear journals and sealably engaging the corresponding gear teeth side faces, said bushing means being formed in a plurality of substantially concentric, partially overlapping parts, said gear journals extending axially through said bushing means and means disposed between at least two of said parts for urging said parts axially apart, said plurality of bushing parts being effective to permit limited flexibility of alignment between the portion of said bushing means engaging the gear teeth side faces and the portion of said bushing means embracing the gear journals, at least one of said parts sealably engaging the corresponding gear side faces and another of said parts embracing the axially extending gear journals in bearing relation.

8. An intermeshing gear type pump having one set of pressure loadable, axially movable bearing and pumping seal defining bushing means embracing axially extending gear journals, said bushing means having pressure responsive motive surfaces adapted in response to application of pressure thereto to cause said bushing means to sealably engage the corresponding gear side faces, a first pressure responsive surface area on the side of said bushing means adapted to engage the gear side faces, a second pressure responsive area constituting the motive surfaces on the side of said bushing means away from said gear side faces, a relief recess formed adjacent the inner periphery of said first pressure responsive surface, and restricted passage means for venting said relief area to inlet pressure in such manner as to provide a smaller pressure drop than would be afforded were the passage not restricted.

9. An intermeshing gear type pump having one set of pressure loadable, axially movable bearing and pumping seal defining bushing means embracing axially extending gear journals, said bushing means having pressure responsive motive surfaces provided thereon adapted in response to application of pressure thereto to cause said bushing means to sealably engage the corresponding gear side faces, a first pressure responsive surface area on the side of said bushing means adapted to engage the gear side faces, a second pressure responsive area constituting the motive surfaces on the side of said bushing means away from said gear side faces, a relief recess formed adjacent the inner periphery of said first pressure responsive surface, and means defining a passage for venting said relief area to inlet pressure, said passage being restricted, at least in part, to reduce the pressure drop.

10. In an intermeshing gear type pump having bearing and pumping seal defining bushing means embracing axially extending gear journals and sealably engaging the corresponding gear teeth side faces, said gear journals extending through said bushing means and said bushing means being particularly characterized by being formed in a plurality of axially disposed parts, means disposed between at least two of said parts for urging said parts apart, said plurality of bushing parts permitting limited flexibility of alignment between the gear journal engaging portion of said bushing means and the portion of said bushing means sealably engaging the gear teeth side faces.

11. In an intermeshing gear type pump having one set of pressure loadable, axially movable bearing and pumping seal defining bushing means embracing axially extending gear journals, said bushing means having pressure responsive motive surfaces provided thereon adapted in response to application of pressure thereto to cause said bushing means to sealably engage the corresponding gear side faces, the gear journal bearing surfaces of said bushing means having axially extending relief grooves formed therein, said grooves communicating at their inner ends with the gear side faces and terminating at their outer ends and axially short of the outer terminal of said bushing, and means disposed between the outer terminals of said bushing means having a slightly greater internal diameter than the outer diameter of the embraced portions of said gear journals to provide passages to the outer ends of said bushing means of substantially smaller volumetric capacity than that of the associated grooves.

JOHN A. LAUCK.
JAMES A. COMPTON.

REFERENCES CITED

The following references are of record in the file of this patent:

UNITED STATES PATENTS

| Number | Name | Date |
|---|---|---|
| 1,285,819 | Smith | Nov. 26, 1918 |
| 1,372,576 | Tullmann | Mar. 22, 1921 |
| 1,379,587 | Fisher | May 24, 1921 |
| 1,597,411 | Kinney | Aug. 24, 1926 |
| 1,644,817 | Conant et al. | Oct. 11, 1927 |
| 2,391,072 | Pugh | Dec. 18, 1945 |
| 2,420,622 | Roth et al. | May 13, 1947 |

FOREIGN PATENTS

| Number | Country | Date |
|---|---|---|
| 358,843 | Great Britain | Oct. 15, 1931 |